July 18, 1944.  D. T. ARCHER  2,354,096
MEANS FOR SHELLING EGGS
Filed Aug. 14, 1942  2 Sheets-Sheet 1
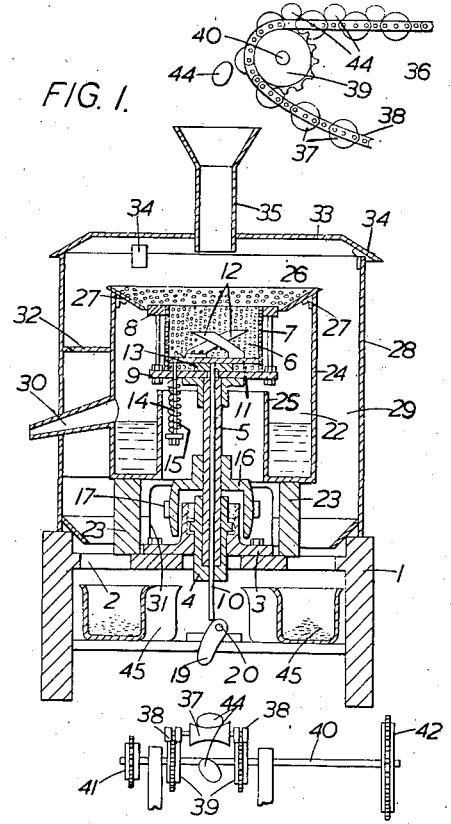
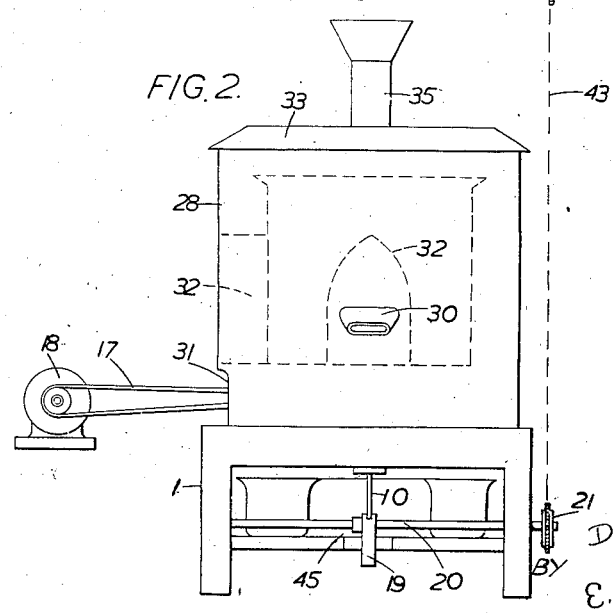
INVENTOR
David T. Archer
BY E. F. Wenderoth
ATTORNEY

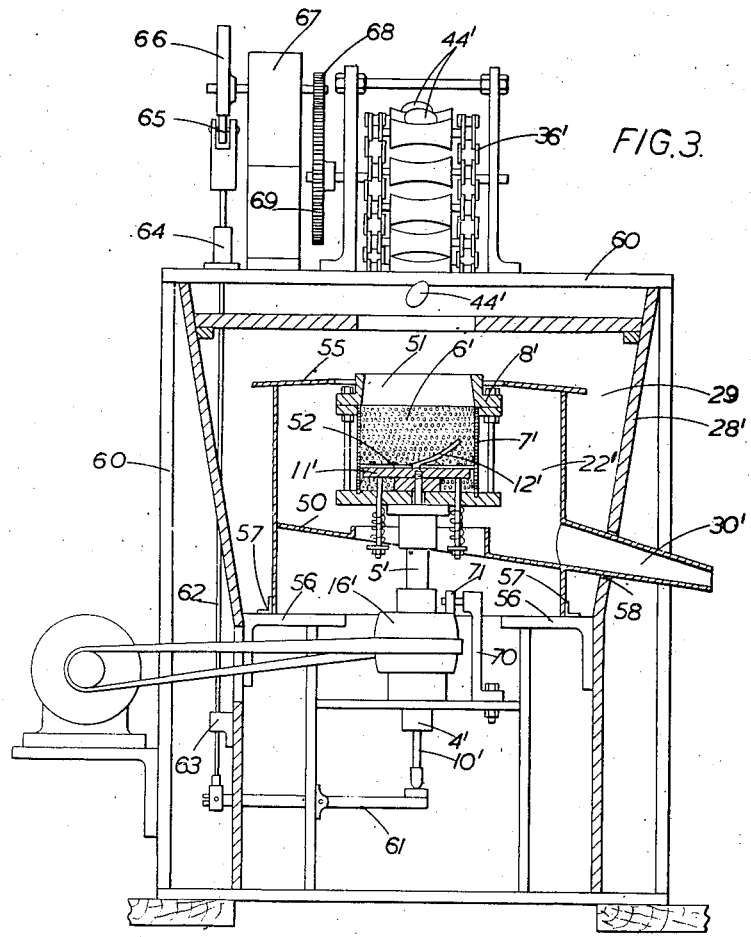
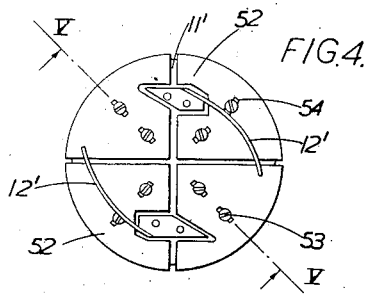
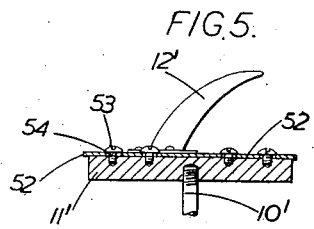
INVENTOR
David T. Archer
BY
E. F. Wenderoth
ATTORNEY Patented July 18, 1944

2,354,096

UNITED STATES PATENT OFFICE 2,354,096

MEANS FOR SHELLING EGGS

David Turner Archer, Dublin, Eire

Application August 14, 1942, Serial No. 454,857
In Great Britain August 15, 1941

8 Claims. (Cl. 146—2)

This invention concerns an improved means for shelling eggs, the object being to enable the liquid contents of eggs to be rapidly and effectively removed from the shells in a simple and efficient manner.

The invention provides a machine for shelling eggs by dropping the eggs periodically upon a rotatable breaking device, straining the liquid from the broken shell, and periodically ejecting the shell after the liquid has been strained therefrom and between the successive droppings of an egg or eggs upon the breaking device. The removal of the liquid is effected by a centrifugal filter and centrifugal action is also utilized to effect the ejection of the shell.

The aforesaid machine for shelling eggs comprises essentially a rotatable perforated drum, a breaking device therein, means for dropping eggs periodically upon the breaking device and means adapted to operate in synchronism therewith for ejecting the broken shells between the successive droppings of an egg or eggs. Preferably the perforated drum is mounted upon a vertical spindle and is open at the top, the bottom of the drum being covered by a disc which is vertically slidable within the drum for the purpose of scraping shell from the sides of the drum and raising same to the top, and means are provided for raising and lowering said disc in unison with the operation of means for dropping eggs periodically into the top of the drum. Advantageously the disc carries one or more breaking devices consisting of blades extending upwards and forwards therefrom in the direction of rotation.

These and other features of the invention are hereinafter described with reference to the accompanying drawings, and it will also be noted that the drum is mounted in an inner container for the liquid contents of the eggs, which in turn is mounted in an outer container for the broken shells ejected from the drum, said inner container having a spout passing through the outer container for the purpose of enabling the liquid to be run off continuously when the inner container has been filled to a predetermined level. Moreover the bearings of the drum are mounted in the frame of the machine in a permanent manner, while the drum and also the containers merely rest in position and may be lifted out of position without disturbing any other parts of the machine when it is desired to remove the containers for cleaning purposes.

In the drawings,

Fig. 1 is a sectional elevation of a machine constructed according to the invention, Fig. 2 is an elevation taken at right angles to Fig. 1, showing the exterior of the machine and the driving arrangements, more or less diagrammatically.

Fig. 3 is a view substantially similar to Fig. 1 showing a slightly modified constructional form of the machine according to the invention, portions only being shown in vertical cross-section.

Fig. 4 is an enlarged plan of a detail of the machine shown in Fig. 3, and

Fig. 5 is a cross-section on line V—V of Fig. 4.

Referring to the drawings, the machine shown in Figs. 1 and 2 comprises a base 1 having a cross member 2, at the centre of which is mounted a support 3 for a footstep bearing 4. The latter consists of an elongated gun-metal bush and receives the lower end of a vertical spindle 5, on the upper end of which is mounted the perforated drum 6 constituting a centrifugal filter.

The drum 6 consists of a foraminous wall 7 secured between a ring 8 and a plate 9 carried by the spindle 5. The spindle 5 is hollow and a rod 10 passes slidably therethrough. At its upper end the rod 10 carries a disc 11 on which are mounted a plurality of upstanding blades 12 which are inclined forwardly with respect to the direction of rotation of the spindle 5. (Thus, if viewed in plan, the direction of rotation of the drum shown in Fig. 1 would be clockwise.) The disc 11 rests upon a thick rubber washer 13 and carries a depending pin 14 which passes through the plate 9 and has a compression spring 15 interposed between said plate and the head of said pin. The spindle 5 also carries a driving pulley 16 on which runs a belt 17 of a high speed electric motor 18 (Fig. 2).

The lower end of the rod 10 is associated with a cam 19 mounted on a shaft 20 carrying a sprocket wheel 21 (Fig. 2), the operation of which is described below.

Surrounding the drum 6 is an inner cylindrical container 22 made of sheet metal and standing on supports 23, the outer wall 24 of said container extending just above the level of the top of the drum 6, while its inner wall 25 forms a hollow shaft about the spindle 5 and terminates immediately beneath the plate 9. A conical annular perforated cover 26 closes the top of the cylindrical container 22, said cover being held in position by three or more tongues 27 engaging the wall 24 so that said cover may be readily lifted off if required and replaced in the correct position with its inner periphery close to the outside of the ring 8.

An outer casing 28 spaced from the wall 24 provides an outer container 29 which is open at the bottom. A spout 30 connected to the inner container passes through the casing 28 to the exterior, and an opening 31 is also provided in the outer casing to permit the passage of the belt 17. The casing 28 is connected to the wall 24 by transverse sheet metal members 32, which as indicated in Fig. 2 are arranged after the fashion of a Gothic arch over the spout 30 and also above the opening 31 through which the belt 17 passes. The casing 28 is surmounted by a lid 33, held in position by tongues 34 and carrying at its centre a funnel 35.

Immediately above the funnel 35 is arranged the delivery end of an egg conveyor 36 of known construction. The conveyor shown in the drawings consists essentially of a series of rubber dumb-bells or concave rollers 37 carried by endless chains 38 passing over sprocket wheels 39 mounted on a spindle 40. The conveyor is driven in the customary manner by a sprocket wheel 41 (Fig. 2) through suitable gearing from an electric motor (not shown), and a further sprocket wheel 42 is mounted on the spindle 40 and connected by a chain 43 with the sprocket wheel 21. The ratio of the wheels 42 and 21 is so chosen that the wheel 21 makes one revolution during the time that the conveyor moves a distance equal to the pitch of the rollers 37.

The operation of the appliance is as follows:

The conveyor 36 being loaded with eggs 44, and the electric motors set in operation, the spindle 5 with the drum 6 revolves rapidly (of the order of 1000 revolutions per minute), and the conveyor 36 delivers an egg into the funnel 35. The egg drops upon the blades 12 of the rapidly rotating drum 6 and the shell is immediately broken. The contents of the egg and the shell are flung by centrifugal force against the wall 7 of the drum, the liquid contents passing through said wall into the container 22, while the shell fragments are retained. Meanwhile the cam 19 is being turned by the chain and sprocket drive 42, 43, 21, and it lifts the rod 10, causing the disc 11 to rise to the top of the drum 6. In so doing, the disc 11 scrapes the shell fragments from the wall of the drum, and when the disc reaches the top they are flung by centrifugal action across the perforated cover 26 into the outer container 29 through which they fall and are collected in suitable receptacles 45 and removed from time to time or they may fall into a chute (not shown) and be continuously removed. The members 32 prevent the shell fragments from lodging above the spout 30 or falling on the belt 17.

The disc 11 remains only momentarily at the top of the drum, and then falls under the combined influence of its own weight and the spring 15, the rubber washer 13 taking up the impact and preventing any risk of damage to the disc. The timing is so arranged that immediately after the disc has returned to the bottom of the drum, another egg is delivered by the conveyor, and the operation is repeated.

When the liquid collected in the container 22 rises to the level of the spout 30 it overflows and may be removed continuously from the machine. Any small fragments of shell which may pass through the wall 7 or the cover 26 sink to the bottom of the container 22 and may be removed at the end of the day's run, when the machine is dismantled for cleaning purposes. This is very readily accomplished, since the containers 29, 22, the lid 33, the cover 26 and the drum 6 merely rest in position and may be lifted up and removed without the least difficulty.

The machine constructed as above described is obviously capable of considerable refinement and modification in its constructional details within the scope of the invention. This is exemplified by Fig. 3 which shows a form of the machine in which the revoluble perforated drum 6', mounted on the hollow spindle 5' carrying a driving pulley 16', is removably supported in a footstep bearing 4' in precisely the same manner as the corresponding parts above described with reference to Figs. 1 and 2. The container 22' within which said drum is mounted however does not in this case form a reservoir in which the separated liquid may collect before overflowing, but it has a sloping bottom 50, the low side of which merges with the outlet 30', thus enabling the liquid to run away directly.

A more effective separation of the solid and liquid constituents of the eggs is made possible by the improved form of the drum and the shell ejecting means illustrated in Figs. 3, 4 and 5. The ring 8' at the top of the drum is extended upwards beyond the foraminous wall 7', and its inner surface 51, which forms a continuation of said wall, is slightly conical. The disc 11' does not fit closely within the drum 6', but it carries four quadrant-shaped scrapers 52 which lie on top of the disc 11' and are secured with freedom of limited radial movement by means of screws 53 which pass through radially elongated holes 54 in said scrapers. The blades 12' are secured to the disc 11' in a rigid manner and the scrapers 52 are cut away so as to clear the bases of the blades. As a result of this construction the scrapers 52 are yieldably pressed against the interior wall of the drum 6' with a predetermined pressure by centrifugal action upon rotation of the drum, and the said wall of the drum is thus very effectively scraped each time the disc 11' rises to remove the broken shell, as already described above with reference to the disc 11 of Fig. 1. The disc 11' however does not rise completely to the top of the ring 8', but falls back after reaching the bottom of the tapered interior surface 51 of said ring, leaving the shell fragments adhering to said surface, where they are held by centrifugal action. Traces of liquid which may accompany the said shell fragments are also caused to flow towards the said surface 51, and on reaching said surface are urged to flow downwards towards the foraminous wall 7' through which they can pass into the container 22'. The shell fragments, which are thus highly dried, are gradually pushed upwards as more fragments are raised by successive operations of the disc 11' and on reaching the top of the ring 8' they are flung off above the annular cover 55 of the container 22' and into the outer container 29'.

The container 29' is more in the nature of a hopper or chute constituted by a preferably wooden casing 28', open at the bottom so as to permit the shell fragments to fall through into any desired receptacle, and having the top and one side removable for cleaning purposes. Brackets 56 secured to the casing 28' support the inner container 22' which is positioned by lugs 57 and can be lifted out whenever required for cleaning or other purposes. The spout 30' of the container 22' passes through an aperture 58 in one wall of the casing 28'.

Modified means for raising and lowering the scraper disc 11' in unison with the dropping of the eggs into the drum 6' are also shown in Fig. 3. A frame 60 built around the machine supports the delivery end of an egg conveyor 36', and a lever 61 is pivoted intermediately upon a lower member of said frame. One end of said lever lies immediately below the bottom of the rod 10' attached to disc 11', and the other end engages a push rod 62. The latter is slidable in guides 63, 64 and carries a roller 65 at its upper end cooperating with a cam 66 which is geared to the electric motor 67 which also drives the egg conveyor through gear wheels 68, 69. A bracket 70 carries a jockey wheel 71 which runs upon the rim of the driving pulley 16', so as to prevent same from lifting in normal operation. If it is desired to lift out the drum 6' and spindle 5' the bracket 70 is readily dismounted.

The operation is similar to that of the machine described above with reference to Figs. 1 and 2. The timing of the cam 66 and the ratio of the gear wheels 68, 69 is such that each time an egg 44' is delivered by the conveyor 36' and falls into the drum 6' the cam 66 thereafter depresses the push rod 62, thereby swinging the lever 61 so as to raise the rod 10' together with the scraper disc 11' so as to scrape the fragments of the broken shell from the inner surface of the foraminous wall 7' of the drum, the cam 66 permitting the parts to return to their original positions (in which they are shown in Fig. 3), before the next egg on the conveyor has reached the point of delivery.

With this machine the separation of the liquid from the shell may be effected so completely that only minute fragments of shell pass with the liquid through the foraminous wall. Such traces of shell may be removed simply by allowing the liquid leaving the machine to flow along a channel or trough preferably about eight to ten feet in length and furnished with a weir over which the liquid flows at the delivery end, the shell fragments gravitating to the bottom of the trough from which they may be cleared out at the end of the day's run.

The invention is not limited to the use of particular dimensions, since from the foregoing description there will be no difficulty in constructing a machine which will operate satisfactorily. It has been found however that a suitable machine for dealing with eggs one by one employs a drum which is approximately nine inches in diameter and five inches deep having a wall of perforated sheet brass of approximately 1/8 inch mesh. A suitable speed of rotation for such a drum is about 1000 R. P. M. and the conveyor is advantageously timed to deliver 120 eggs per minute.

I claim:

1. A machine for shelling eggs comprising a frame, a footstep bearing mounted therein, a hollow spindle seated in said bearing, a drum concentrically mounted on said spindle, open at the top and having a foraminous circumferential wall, a disc axially slidable on said drum with its peripheral edge in proximity to said wall, blades extending upwards from said disc, means preventing relative rotation of said disc and drum, a rod secured to said disc and passing through said hollow spindle, an annular container around said drum, an annular cover to said container surrounding the drum near the top thereof, an outer casing surrounding and spaced from said container, means for dropping eggs periodically into said drum and for reciprocating said rod in synchronism with the operation of the egg-dropping means.

2. In a machine for shelling eggs, a centrifugal filter comprising a vertical spindle, a drum with a foraminous circumferential wall concentrically mounted thereon, said drum being open at the top and having its interior surface immediately adjacent to said open top conically tapered, a disc slidably mounted in said drum with its peripheral edge in proximity to said foraminous wall, upstanding blades carried by said disc within the drum, means to prevent rotation of the disc relative to the drum, spring means urging said disc towards the bottom of the drum, and means for moving said disc axially within the drum in opposition to said spring means.

3. In a machine for shelling eggs, a centrifugal filter comprising a vertical spindle, a drum with a foraminous circumferential wall concentrically mounted thereon, said drum being open at the top and having its interior surface immediately adjacent to said open top conically tapered, a disc slidably mounted in said drum with its peripheral edge in proximity to said foraminous wall, segmental plates secured to the upper surface of said disc with freedom of sliding movement radially thereon, the outer peripheral edges of said plates conforming to the contour of the foraminous wall, upstanding blades carried by the disc within the drum and passing through cut-away portions of said plates, means to prevent rotation of the disc relative to the drum, spring means urging said disc towards the bottom of the drum, and means for moving said disc axially within the drum in opposition to said spring means.

4. A machine for shelling eggs comprising a vertical spindle, a drum concentrically mounted upon the upper end thereof, open at the top and having a foraminous circumferential wall, a disc slidable axially within said drum with its peripheral edge in proximity to said foraminous wall, means preventing relative rotation of said disc and drum, blade means in said drum rotatable therewith and extending above said disc, means for dropping eggs periodically upon said blade means, and means operatively geared to said egg dropping means for raising and lowering said disc within said drum after each egg-dropping operation.

5. A machine for shelling eggs comprising an open-topped centrifugal filter of the type having a rotatable and axially movable bottom disc, mounted with its axis vertical, rotatable blade means mounted in said filter and extending above said disc, an egg conveyor of the positive egg-delivery type arranged with its delivery end directly above and spaced from said blade means, means for operating said conveyor to deliver eggs periodically upon said blade means and means for raising and lowering said disc geared to the conveyor operating means and timed to operate between the consecutive deliveries of eggs by said conveyor.

6. A machine for shelling eggs comprising a vertical spindle, a drum concentrically mounted thereon and having a foraminous circumferential wall, a disc slidable axially within said drum with its peripheral edge in proximity to said foraminous wall, means preventing relative rotation of said disc and drum, blades mounted eccentrically upon and upstanding from said disc, means for dropping eggs at regular intervals upon said blades and means positively geared thereto for raising and lowering said disc between each said intervals.

7. A machine for shelling eggs comprising a vertical spindle, a drum concentrically mounted thereon and having a foraminous circumferential wall, a disc slidable axially within said drum with its peripheral edge in proximity to said foraminous wall, means preventing relative rotation of said disc and drum, blades mounted on said disc and extending upwardly and forwardly in the normal direction of rotation thereof, means for dropping eggs at regular intervals upon such blades and means positively geared thereto for raising and lowering said disc between each said intervals.

8. A machine for shelling eggs comprising a vertical spindle, a drum with a foraminous circumferential wall concentrically mounted thereon, said drum being open at the top and having its interior surface immediately adjacent to said open top tapered inwardly, a disk slidably mounted in said drum with its peripheral edge in proximity to said circumferential wall, segmental plates secured to the upper surface of said disc with freedom of sliding movement radially thereon, the outer peripheral edges of said segments conforming to the contour of said foraminous wall, upstanding blades secured to said disc and passing through cut-away portions of said plates, means to prevent rotation of said disc relatively to the drum, means for dropping eggs at regular intervals into the drum, and means operable in timed relation therewith for raising said disc until the peripheral edges of the segmental plates reach the said tapered surface and thereafter lowering said disc between each said intervals.

DAVID T. ARCHER.